(12) United States Patent
Bierbaum et al.

(10) Patent No.: US 7,832,634 B1
(45) Date of Patent: Nov. 16, 2010

(54) CUSTOMER CARE INTELLIGENT ROUTING

(75) Inventors: Christopher J. Bierbaum, Overland Park, KS (US); Robin D. Katzer, Olathe, KS (US); Todd N. Koellner, Overland Park, KS (US); Kevin Zhu, Overland Park, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 844 days.

(21) Appl. No.: 11/690,291

(22) Filed: Mar. 23, 2007

(51) Int. Cl.
*G06K 5/00* (2006.01)
(52) U.S. Cl. ...................... 235/380; 235/492
(58) Field of Classification Search ............. 235/492; 705/1
See application file for complete search history.

(56) References Cited

U.S. PATENT DOCUMENTS

2004/0235523 A1* 11/2004 Schrire et al. ............... 455/558

OTHER PUBLICATIONS

Gailloux, Michael, et al, Patent Application entitled "Systems and Methods for Enabling Customer Care Assistance with Self-Service Transactions," filed Mar. 24, 2006, U.S. Appl. No. 11/388,673.

Zhu, Kevin, Patent Application entitled "Mobile Device-based Control of Smart Card Operation," filed Apr. 2, 2007, U.S. Appl. No. 11/695,344.

* cited by examiner

*Primary Examiner*—Seung H Lee
*Assistant Examiner*—Christopher Stanford

(57) ABSTRACT

A system is provided for customer care intelligent routing. The system includes a mobile device and a server. The mobile device includes a transaction component and an error manager. The error manager determines that an error occurred during a point-of-sale transaction involving the transaction component and promotes the transmitting of transaction data to the server. The server determines a provider related to the error, and promotes the routing of the transaction data to the related provider.

20 Claims, 5 Drawing Sheets

CUSTOMER CARE INTELLIGENT ROUTING

CROSS-REFERENCE TO RELATED APPLICATIONS

This application includes subject matter related to the following applications, which are hereby incorporated by reference: U.S. patent application Ser. No. 11/388,673 filed Mar. 24, 2006, entitled "Systems and Methods for Enabling Customer Care Assistance with Self-Service Transactions," by Michael A. Gailloux, et al., and U.S. patent application Ser. No. 11/695,344, filed Apr. 2, 2007, filed entitled "Mobile Device-Based Control of Smart Card Operation," by Kevin Zhu.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Transaction components are portable items that store data, such as credit cards, debit cards, gift cards, access cards, and cards for various prepaid services or goods. Magnetically encoded transaction components typically store data in a magnetic strip. An example of a transaction component is a "smart card," which stores data in nonvolatile memory and typically contains data processing circuitry that offers some degree of computing capacity.

A smart card can be a "proximity read" smart card, which can communicate with a point of sale device without physically contacting the point of sale device. Communication between a proximity read smart card and various types of point of sale devices can occur via a radio frequency signal, optical signal, wireless Internet connection, magnetic or other communication method known in the art. A proximity read smart card can be a radio frequency identification card, or RFID card, but other technologies might be used. When an RFID card is brought into the proximity of a point of sale device, a radio frequency signal can be exchanged between the RFID card and the point of sale device. A RFID card can be used to make automatic payments at, for example, highway tolls, or to provide access to restricted areas. A RFID card in an automobile can be read by a point of sale device at a toll booth. As the automobile passes through the toll booth, the point of sale device can cause a toll to be automatically deducted from a prepaid account or billed to a credit card.

A mobile device, such as a mobile phone, can include a transaction component, which can include a smart card. The transaction component on a mobile device can include not only the smart card itself, but also all of the mobile device hardware and software that promotes transactions. Thus, if a point of sale device is present at a location where commercial transactions occur or where proximity read smart cards are used, a transaction component in a mobile phone can make payments, provide access to restricted areas, and perform other functions or transactions typically performed by smart cards. A mobile device can implement the functionality of multiple smart cards by containing a multiple application-smart card, a smart card that contains smart card applications from one or more application providers. A smart card application is an application that resides in a smart card operating system to perform certain desired functions. An application provider is an entity that owns a smart card application and is responsible for providing customer support for the smart card application. Multiple smart card applications on a smart card enable the multiple application-smart card to perform functions corresponding to each smart card application. Each smart card application on the multiple application-smart card can be provided by different application providers. A mobile device user can use a mobile wallet to select any of the multiple smart card applications for a transaction.

Due to the complexities of the hardware and software involved with mobile devices, transaction components, smart cards, smart card applications, and point of sale devices, errors often occur during transactions between a transaction component on a mobile device and a point of sale device.

SUMMARY OF THE INVENTION

The present disclosure provides systems and methods for customer care intelligent routing. In some embodiments, the system includes a mobile device and a server. The mobile device includes a transaction component and an error manager. The error manager determines that an error occurred during a point-of-sale transaction involving the transaction component and promotes the transmitting of transaction data to the server. The server determines a provider related to the error, and promotes the routing of the transaction data to the related provider.

In some embodiments, a method is provided for customer care intelligent routing. The method includes determining whether an error has occurred during a point-of-sale transaction involving a mobile device. The method also includes promoting the transmitting of transaction data to a server. Furthermore, the method includes determining a provider related to the error. Additionally, the method includes promoting the providing of the transaction data to the related provider.

In some embodiments, the system includes a mobile device comprising a transaction component and an error manager. The error manager determines that an error has occurred during a point-of-sale transaction with the transaction component. The error manager also determines a provider related to the error and promotes routing of the transaction data to the related provider.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
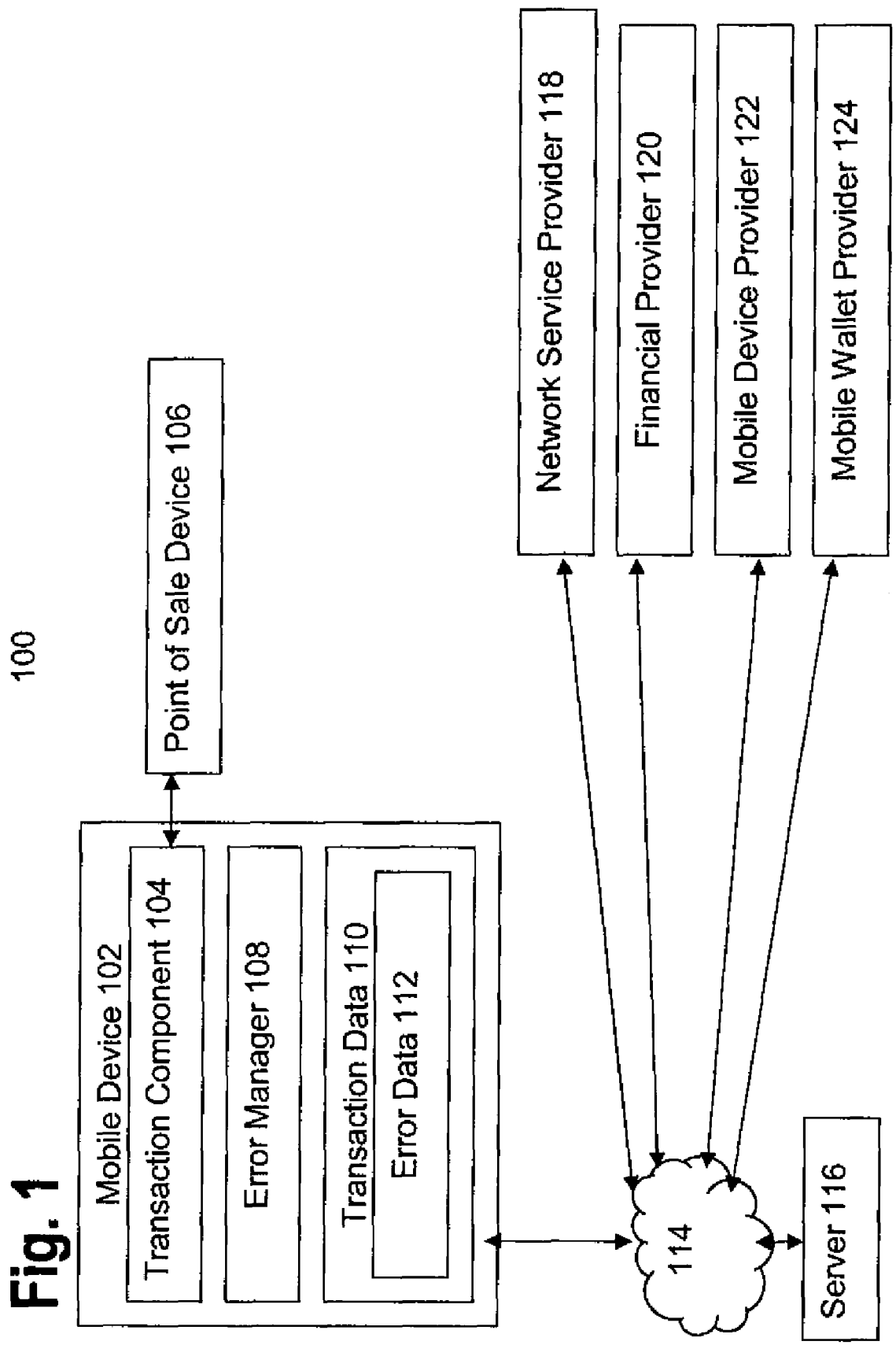
FIG. 1 shows a block diagram of a system for customer care intelligent routing according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In order to report that a transaction error occurred during a point of sale transaction, a mobile device user must currently call a customer care center, visit a retail store, or enter information through a website. However, because a mobile phone user has no way to determine the cause of the transaction error, the mobile device user cannot determine whose customer care center, retail store, or website to use. For example, the transaction error can be caused by a physically damaged mobile phone, dropped communications, exceeding a credit limit, or problems with selecting a smart card application. The mobile device user cannot determine whether to contact a mobile phone manufacturer for a physically damaged mobile phone, a network service provider for dropped communications, a credit card company for exceeding a credit limit, or a mobile wallet provider for problems with selecting a smart card application.

When calling a customer care center reporting an error, the mobile device user is typically asked to input a variety of personal data through an interactive voice response system and thereby attempt to describe the problem to an automated system so as to enable routing the call to the correct department. The mobile device user then has to wait on hold until a representative can help them. While waiting on hold the mobile device user is using resources of the customer care center and thus adding to the cost of operations for a customer care center. Upon being connected with a customer care representative the mobile device user must again provide their personal information to verify they have proper authorization to conduct the transaction. After providing their personal information again, they must also recount the problem they are having to the customer care representative, a problem which the mobile device user may not be able to accurately describe. The process of the mobile device user providing the same information multiple times is frustrating for the mobile device user and inefficient and costly to the customer care center, particularly when the customer care representative disclaims responsibility for the transaction error and instructs the mobile device user to repeat the process by calling another provider that may or may not be able to assist with the transaction error.

The mobile device user may not know which provider can correct the transaction error. It is not efficient for such problems to be handled by retail locations. Requiring a mobile device user go to a retail store to report a transaction error is similarly inconvenient for the mobile device user and costly to the device provider. The retail store has a lot of overhead costs including lease payments, electricity, as well as needing to hire an employee that duplicates the duties of the customer care center.

Using a website to report transaction errors can be more convenient and cost effective than the alternative solutions, but the mobile device user still does not know whose website to use. Furthermore, if a mobile device user has problems using the website they must either call customer care or visit a retail store to get assistance. Any information entered through the website will usually not be transferred to the ultimate customer care representative and the mobile device user will have to start from scratch with each new customer care representative.

Accordingly, it would be desirable to provide a system and a method to route a mobile device user to the customer care center most closely related to a mobile device transaction error. In some embodiments, the system includes a server and a mobile device that includes an error manager. If the error manager determines that a mobile device transaction error has occurred, the mobile device transmits transaction data to the server. The server analyzes the transaction data to identify which provider which provider is apparently the best starting point to correct or assist with the error and routes the transaction data to the identified provider. The transaction data can include error data and can enable a customer care center for the identified provider to contact the mobile device to correct the error. In some embodiments, the server also connects the mobile device user with a customer care center representative for the identified provider by transferring a call from the mobile device to the identified provider. For example, the mobile device user does not have to contact a number of providers before reaching the provider that can correct or assist with the transaction error. Also, by providing the transaction data to the identified provider, the mobile device user does not have to spend time or become frustrated by recounting the problem to multiple providers.

FIG. 1 shows a block diagram of a system 100 for customer care intelligent routing according to an embodiment of the present disclosure. The system 100 includes a mobile device 102, which includes a transaction component 104 to communicate with a point of sale device 106, or other vendor device, to engage in transactions. The point of sale device 106 can engage in some transactions that do not involve actual sales, such as providing access to restricted areas. The communication between the transaction component 104 and the point of sale device 106 can be a radio frequency signal, optical signal, an electrical or magnetic "contact reader" signal, or other communication method known in the art.

In an example of the mobile device 102 being used in the manner of a RFID card, the mobile device 102 can be brought into the proximity of the point of sale device 106. The point of sale device 106 can emit a radio frequency signal that can be received by the transaction component 104. Subsequently, the point of sale device 106 can process the information appropriately, for example by opening a gate or by deducting a toll from an account.

The mobile device 102 also includes an error manager 108 to determine whether an error has occurred during a transaction between the transaction component 104 and the point of sale device 106. An error can also occur when the transaction component 104 is not actively engaged in communications with the point of sale device 106, such as when the user of the mobile device 102 is using the transaction component 104 to review information associated with smart card applications. The error manager 108 can actively monitor for transaction errors in the transaction component 104, passively receive notices of transaction errors from the transaction component 104, or engage in any combination of actively monitoring transaction errors and passively receiving notices of transaction errors.

Transaction data 110 maintains data of mobile device transactions, including transactions that have successfully completed and mobile device transactions that have terminated due to transaction errors. The transaction data 110 can include data for a current mobile device transaction, historical data for previous mobile device transactions, and error data 112 that specifies an error that occurred during a mobile device transaction. The transaction data 110 can also include data that specifies information associated with the mobile device 102, mobile device 102 state data, information associated with smart card applications, and smart card application state data. The error data 112 can also include a status code, which is data that specifies a current condition of either the mobile device 102 or the point of sale device 106. A provider can use historical transaction data that supplements the current transaction data to identify and correct a transaction problem. For example, if the historical transaction data indicates that a specific smart card application has already conducted successful transactions, then any current problem with the specific smart card application may not be attributable to the initial requirement to activate the smart card application.

For an example of a commercial transaction, the transaction data 110 can include, but is not limited to, the commercial establishment where the transaction occurs, the item for purchase, the amount of the purchase, the balance on the smart card application used for the purchase. The transaction data 110 can also include the credit limit on the smart card application used for the purchase, electronic coupons applicable to the purchase, reward programs applicable to the purchase, the smart cards applications accepted at the place of purchase, and the most recently used smart card application. Various categories of purchases include, for example, automobile fuel, airline tickets, convenience store snacks, grocery store food, and other goods and services available through retail merchants. The error data 112 includes information that can be used to identify the type of transaction error and to identify a provider that can correct the transaction error.

The mobile device 102 can transmit the transaction data 110, including the error data 112, over a network 114 to a server 116. The server 116 can identify a provider that can efficiently correct or assist with the error based on the transaction data 110 and the error data 112. The server 116 may also route the transaction data 110, including the error data 112, to the identified provider. For example, the identified provider can be a network service provider 118, such as a mobile phone network service provider, a financial provider 120, such as a credit card company, a mobile device provider 122, such as a mobile phone manufacturer, or a mobile wallet provider 124. While four providers are shown in FIG. 1, other types are also contemplated.

Although the present disclosure discusses identifying the provider to remedy the error, it will be appreciated that an error might be related to several providers, one or more of which might be able to remedy the errors. In some embodiments, one or more providers that are related to the error might be identified and the present system might select a provider having a higher probability or likelihood of being able to resolve the error or being a more relevant choice than others. Therefore, selection of "a" or "the" provider related to the error might include selection of one or more providers or might involve a selection process based on the error and the varying providers' relevance or relatedness to the error. Also the selected provider might subsequently determine that the error actually should have been directed to another provider and forward the error and information accordingly.

The present disclosure contemplates that the various providers will agree or contract with one another regarding assignment of responsibility and support for the various equipment and service errors and problems. The present disclosure may use such support agreements to determine, for example, which provider should be contacted about a particular transaction error.

While the current embodiment describes the transaction errors as being identified and corrected, it will be appreciated that the transaction error(s) may not be readily identifiable or correctable. Thus while the present disclosure is described as correcting the errors, in some cases the errors may only be identified, addressed, worked-around, or attempts might be made, whether or not successful, to correct the errors, all of which are within the scope of the present disclosure.

Figure 2:
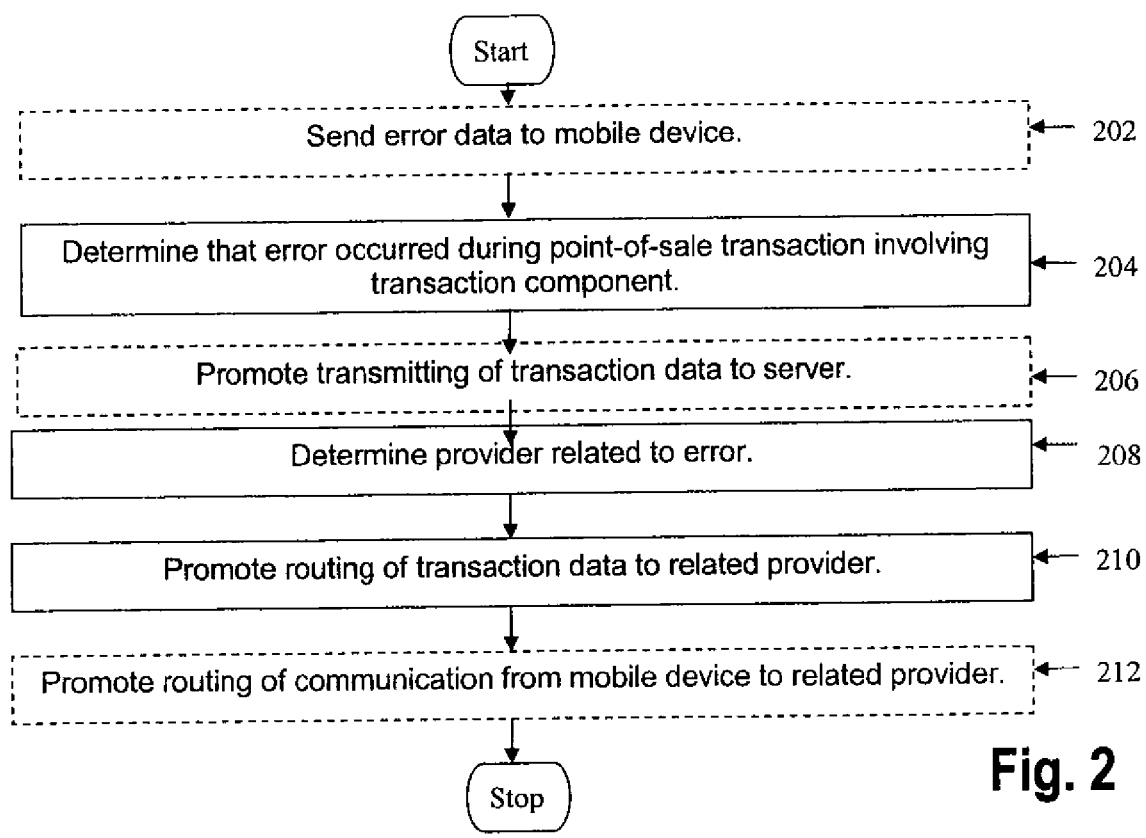
FIG. 2 shows a flowchart of a method for customer care intelligent routing according to some embodiments of the present disclosure.

FIG. 2 is a flowchart illustrating a method for customer care intelligent routing according to an embodiment of the present disclosure. The customer care intelligent routing system 100 can use the method to identify a provider that can correct or assist with a transaction error, route the transaction data 110 to the identified provider, and route communication from the mobile device 102 to the identified provider.

In box 202, the point of sale device 106 can optionally send the error data 112 to the mobile device 102. For example, the point of sale device 106 determines that during a transaction with the mobile device 102 an error has occurred. The transaction component 104 may require the user of the mobile device 102 to enter a personal identification number (PIN) to authorize the use of a specific smart card application included in the transaction component 104. If the PIN entered on the mobile device 102 for the transaction component 104 does not match the PIN listed by the financial provider 120 for the corresponding smart card application in the transaction component 104, the proposed transaction is rejected by the point of sale device 106. This rejection generates an error code, which the point of sale device 106 may send as part of the error data 112 to the mobile device 102. The mobile device 102 can then convey the error data 112 to the transaction component 104. In other embodiments of the present disclosure, the error manager 108 on the mobile device 102 can determine whether an error has occurred during a point-of-sale transaction without the need for receiving the error data 112 from the point of sale device 106.

In box 204, the error manager 108 determines that an error occurred during a point-of-sale transaction involving the transaction component 104. For example, the error manager 108 might determine that when the user of the mobile device entered a PIN, an entry key on the mobile device 102 malfunctioned, which caused repeated entry of a particular key. In some embodiments of the present disclosure, the error manager 108 can also determine that an error occurred during a point-of-sale transaction based on the error data 112 sent by the point of sale device 106 to the mobile device 102, whereby the mobile device 102 conveys the error data 112 to the transaction component 104. The error manager 108 can actively monitor the transaction component 104 to detect, for example, an entry key error as part of the error data 112, and/or passively receive a notice of an entry key error as part of the error data 112 from the transaction component 104.

In box 206, the error manager 108 promotes the transmitting of the transaction data 110 to the server 116. For example, the error manager 108 has access to the transaction data 110 for the current transaction involving the transaction component 104, where the transaction data 110 includes the error data 112. Additionally, the error manager 108 can access historical transaction data stored in memory for previous transactions. Instead of directly transmitting the transaction data 110 to the server 116, the error manager 108 can enable the mobile device 102 to transmit the transaction data 110 including the error data 112 to the server 116. The mobile device 102 can communicate with the server 116 through the network 114 by a standard wireless telephony protocol (such as code division multiple access), a wireless internet connection, or some other means of wireless communication. The server 116 receives the transaction data 110, which can specify the commercial establishment where the transaction occurs, the item for purchase, the amount of the purchase, and includes the error data 112, which might specify, for example, a PIN authentication error.

Although various components of the present system, such as the error manager 108, mobile device 102, transaction component 104, servers 116, and so on are described as promoting an action, such as transmission or routing of information or data, these actions might actually being accomplished by other components or systems. For example, the error manager 108 or transaction component 104 might be described as promoting transmission of transaction data, but a transmitter on the mobile device 102 might be responsible for the actual transmission. Other systems used or supporting such activities will readily suggest themselves to one skilled in the art and are within the spirit and scope of the present disclosure.

In box 208, the server 116 determines the provider related to the error. The server 116 analyzes the transaction data 110, which includes the error data 112, to determine the provider that is apparently the most closely related to the transaction error. For example, if the error data 112 indicates that only one digit of the PIN entered on the mobile device 102 for the smart card application selected from the transaction component 104 does not match the corresponding digit of the PIN listed by the financial provider 120 corresponding to the smart card application, the server 116 determines that the provider related to the transaction error is the financial provider 120. The error data 112 can also indicate whether a specific smart card application has exceeded its credit limit or a credit bureau rates the mobile device user as sufficiently creditworthy. Additionally, the error data 112 can indicate whether the mobile device 102, and hence the smart card application, has not been reported as stolen.

In another example, if the error data 112 indicates that an entry key on the mobile device 102 malfunctioned, repeatedly entering the same value for all of the subsequent option selections, the server 116 determines that the provider related to the transaction error is the mobile device provider 122. In yet another example, if the error data 112 indicates dropped communications between the mobile device 102 and the financial provider 120 during the process of requesting smart card access information, the server 116 determines that the provider related to the transaction error is the network service provider 118. In one more example, if the error data 112 indicates that problems with selecting a smart card application caused the transaction error, the server 116 determines that the provider related to the transaction error is the mobile wallet provider 124.

In box 210, the server 116 promotes the routing of the transaction data 110 to the related provider. For example, the server 116 directly sends the transaction data 110 to the related provider. In another example, the server 116 communicates contact information for the related provider to the mobile device 102, such that when the mobile device 102 attempts to contact a provider in response to the transaction error, the mobile device 102 sends the transaction data 110 to the related provider.

The transaction data 110 enables the related provider to communicate with the mobile device 102 to correct or mitigate the transaction error. For example, the customer care department at the financial provider 120 receives the transaction data 110, which includes the error data 112. The error data 112 indicates that the selected smart card application on the transaction component 104 has charged beyond the credit limit provided by the financial provider 120. Then the financial provider 120 sends an e-mail to the mobile device 102 specifying the reason that the financial provider 120 did not approve the transaction and any steps that the user of the mobile device 102 can take to raise the credit limit for the smart card application.

In box 212, the server 116 promotes the routing of communication from the mobile device 102 to the related provider. For example, the server 116 communicates contact information for the related provider to the mobile device 102, such that when the user of the mobile device 102 attempts to call a provider in response to the transaction error, the mobile device 102 calls the related provider as determined by the server 116. The server 116 can communicate contact information for the related provider by sending a phone number and/or a website address to the mobile device 102. The user of the mobile device 102 can directly select an option to call the number sent or access the website address sent. Additionally, the mobile device 102 can provide an option for the mobile device user to contact the related provider by displaying an option on the mobile device that prompts the user to contact customer care in response to a transaction error, without specifying whose customer care is to be contacted. If the mobile device user selects this option, when the mobile device user communicates with the related provider as identified by the server 116, the related provider may identify itself to the mobile device user.

The transaction data 110 enables the mobile device 102 to communicate with the related provider to address or mitigate the transaction error. For example, the mobile device user uses keys on the mobile device 102 to select a button displaying an option that reads "contact customer care." In response to a selection, the mobile device 102 calls the number for the mobile device provider 122 that was identified by the server 116 as the related provider. When the mobile device user speaks to the customer care department for the mobile device provider 122, the customer care department accesses the transaction data 110 including the error data 112 for the transaction error. Where appropriate error data is provided, the mobile device user may not need to describe the transaction or the error. Based on the analysis of the error data 112 which might indicate a software error, for example, the mobile device provider 122 instructs the mobile device user how to download a corrected version of software to address the transaction error. Upon downloading the software, the mobile device user might be able to successfully conduct the previously attempted transaction using the mobile device 102.

In some embodiments, if the error manager 108 has the capability to determine the provider related to the transaction error, the error manager 108 does not transmit the transaction data 110 to the server 112 to determine the provider related to the transaction error. In these embodiments, the error manager 108 determines that an error occurred during a point-of-sale transaction involving the transaction component 104, determines the provider related to the error, and promotes the routing of the transaction data 110 to the related provider. The error manager 108 can also promote the routing of communication from the mobile device 102 to the related provider. In this case, the server 116 may not be necessary.

Figure 3:
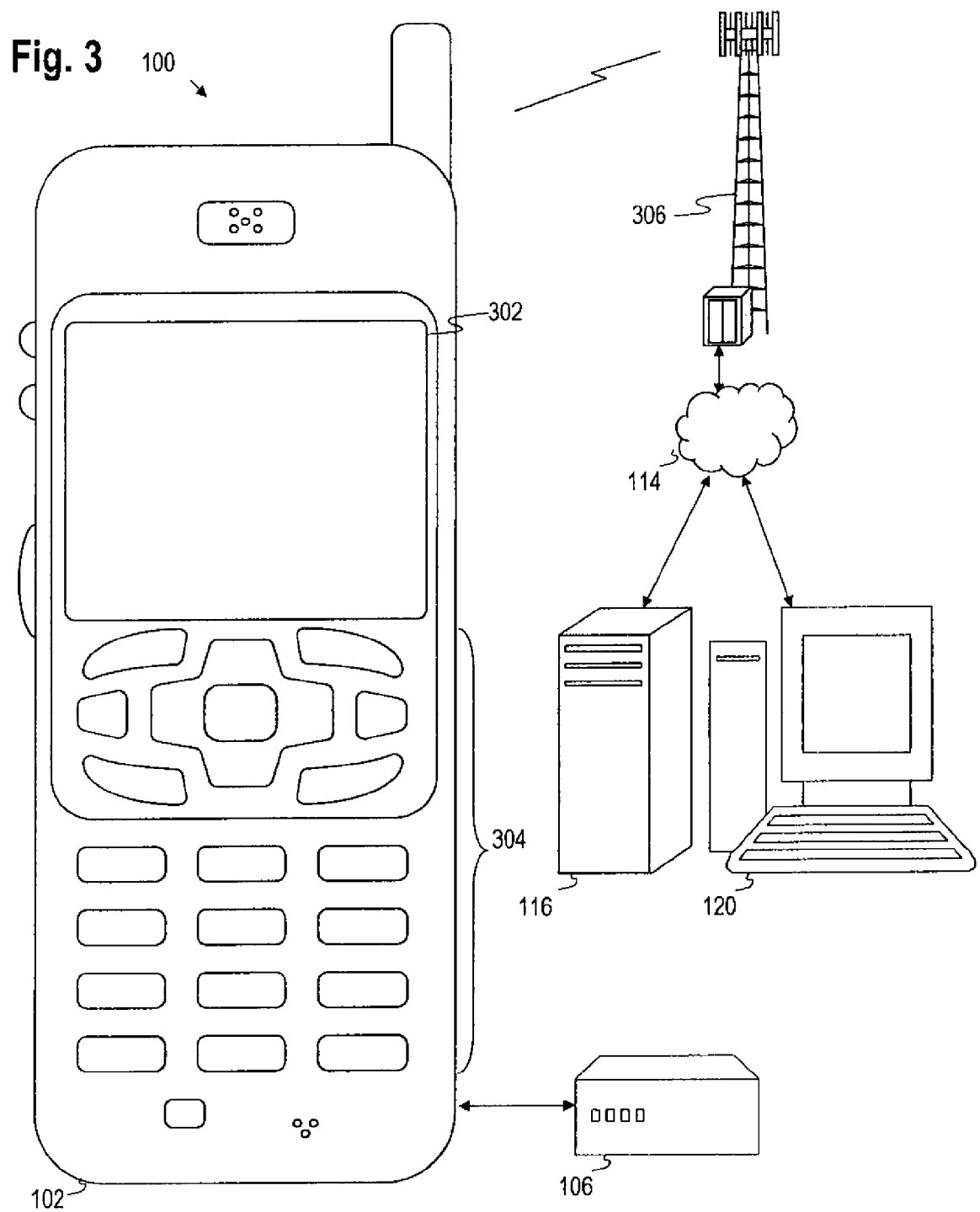
FIG. 3 shows an illustrative wireless communications system.

FIG. 3 shows the system 100 as a wireless communications system which provides the context for the systems and methods of the present disclosure. The system 100 includes the illustrative mobile device 102. Though illustrated as a mobile phone, the mobile device 102 may take various forms including a personal digital assistant (PDA), a mobile computer, a digital camera, a digital music player, and an electronic key fob for keyless entry. Many suitable mobile devices combine some or all of these functions.

The mobile device 102 includes a display 302 and a touch-sensitive surface or keys 304 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction.

The mobile device 102 may communicate through a cell tower 306 and the network 114 to communicate with various servers, such as the server 116. The server 116 may interact with a provider, such as the financial provider 120, through the network 114. While only one provider is shown in FIG. 1, other providers could be present. The mobile device 102 may communicate with the financial provider 120 through the network 114 and the cell tower 306 by a standard wireless telephony protocol (such as code division multiple access), a wireless internet connection, or some other means of wireless communication.

Figure 4:
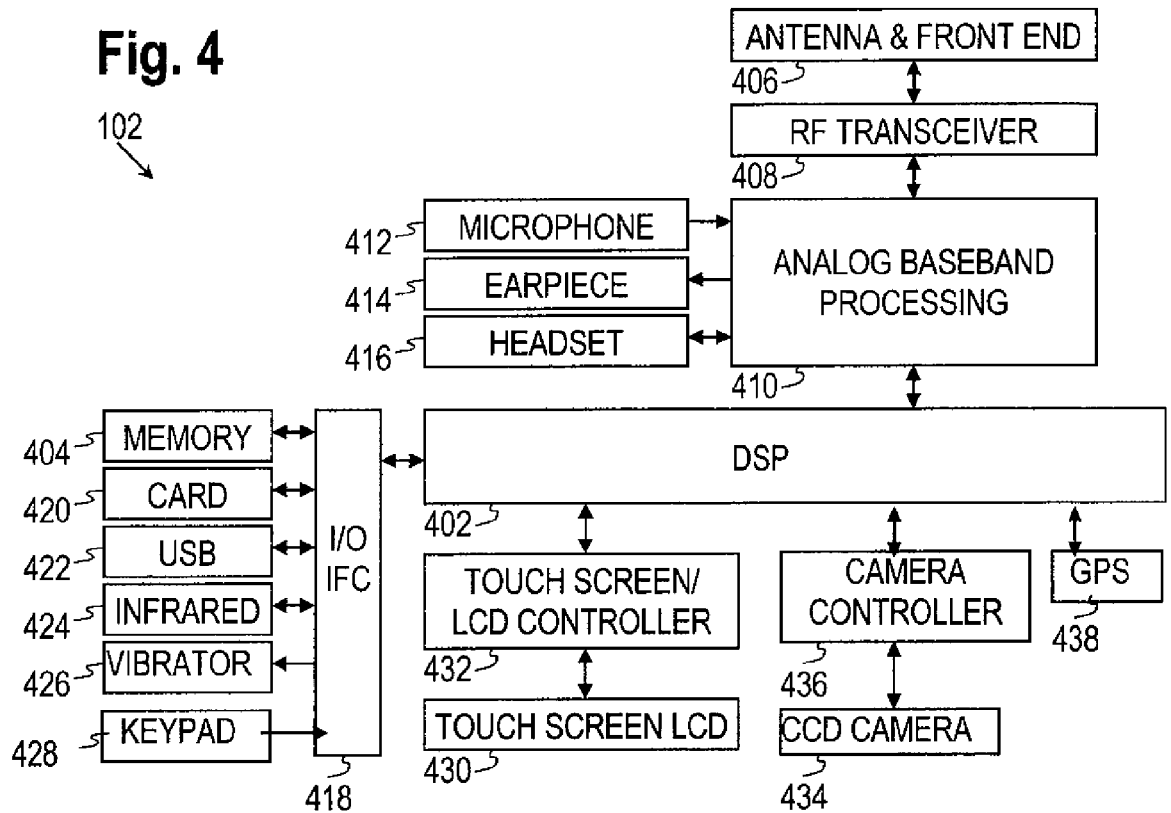
FIG. 4 shows a block diagram of an illustrative mobile device.

FIG. 4 shows a block diagram of the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a memory card 420, a universal serial bus (USB) port 422, an infrared port 424, a vibrator 426, a keypad 428, a liquid crystal display (LCD) with a touch sensitive surface 430, a touch screen/LCD controller 432, a charge-coupled device (CCD) camera 434, a camera controller 436, and a global positioning system (GPS) sensor 438.

The DSP 402 or some other form of controller or central processing unit operates to control the various components of the mobile device 102 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a cellular network or some other available wireless communications network. The RF transceiver 408 provides frequency shifting, e.g., converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the mobile device 102 to be used as a cell phone.

The DSP 402 may send and receive digital communications with a wireless network via the analog baseband processing unit 410. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The infrared port 424 and other optional ports such as a Bluetooth interface or an IEEE 802.11 compliant wireless interface may enable the mobile device 102 to function as a smart card, communicating wirelessly with other nearby mobile devices and/or wireless base stations. In some contemplated systems, the mobile device 102 is able to wirelessly exchange information at a point-of-sale when placed near a suitable transceiver, such as the point of sale device 106.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the I/O interface 418 to provide one mechanism for the user to make selections, enter information, and otherwise provide input to the mobile device 102. Another input mechanism may be the touch screen display 430, which may also display text and/or graphics to the user. The display controller 432 couples the DSP 402 to the touch screen display 430.

The CCD camera 434 enables the mobile device 102 to take digital pictures. The DSP 402 communicates with the camera 434 via the camera controller 436. The GPS sensor 438 is coupled to the DSP 402 to decode global positioning system signals, thereby enabling the mobile device 102 to determine its position.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, the robustness of the card, and the functionality. The standard for contactless smart card communications is ISO/IEC 14443, dated 2001. An alternative standard for contactless smart cards is ISO 15693, which allows communications at distances up to 50 cm.

Figure 5:
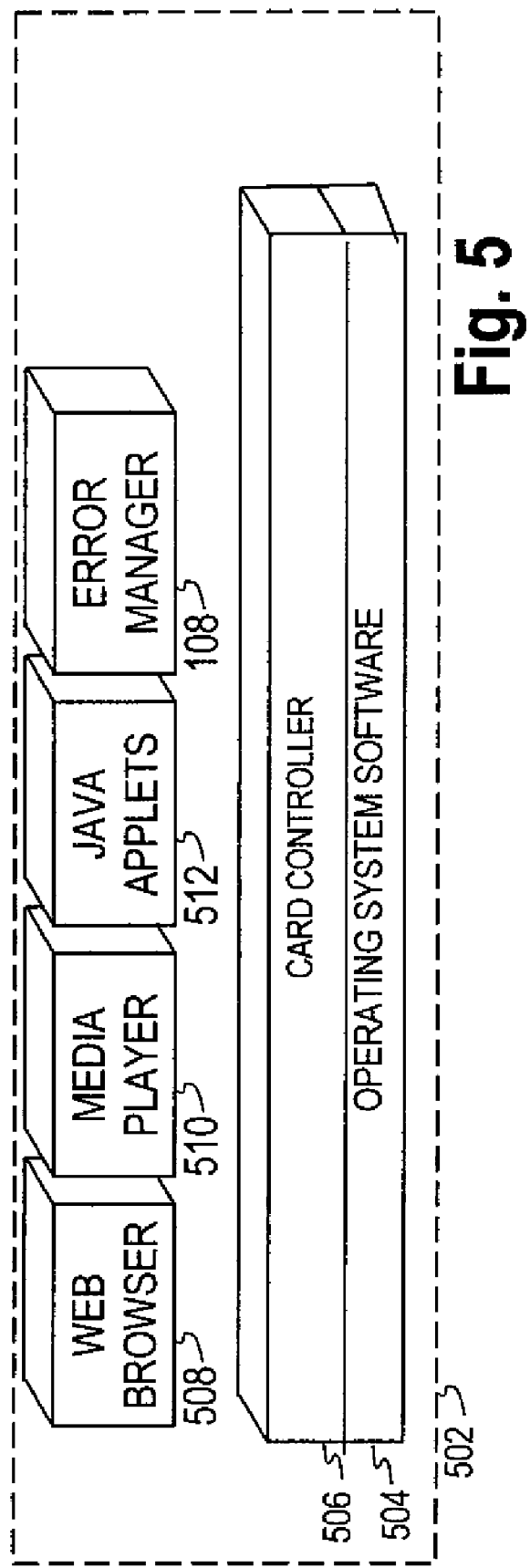
FIG. 5 shows a block diagram of an illustrative software configuration for a mobile device.

FIG. 5 illustrates a software environment 502 that may be implemented by the DSP 402. The DSP 402 executes operating system software 504 that provides a platform from which the rest of the software operates. The operating system software 504 provides drivers for the mobile device hardware with standardized interfaces that are accessible to application software. The operating system software 504 includes an application management system ("AMS") 506 that transfers control between applications running on the mobile device 102. Also shown in FIG. 5 are a web browser application 508, a media player application 510, applets 512, and the error manager 108. The web browser application 508 configures the mobile device 102 to operate as a web browser, allowing the user to enter information into forms and select links to retrieve and view web pages. The media player application 510 configures the mobile device to retrieve and play audio or audiovisual media. The applets 512 may configure the mobile device 102 to provide games, utilities, and other functionality.

Figure 6:
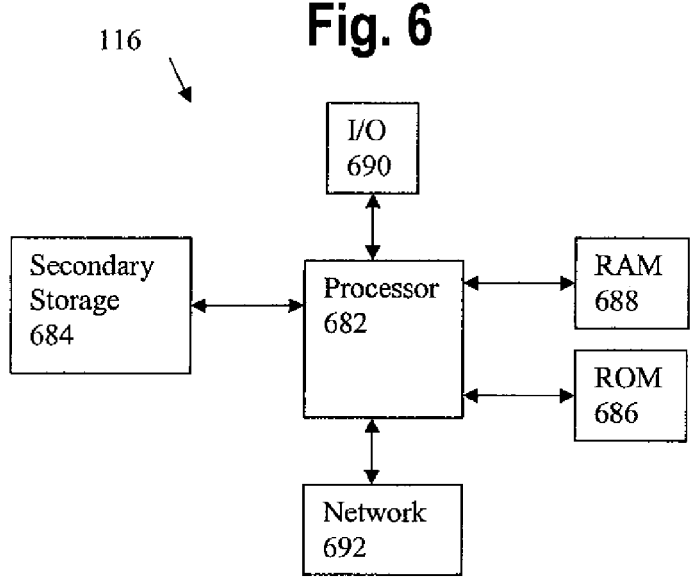
FIG. 6 shows an illustrative general purpose computer system suitable for implementing portions of the several embodiments of the present disclosure.

The system described above may be implemented on any general-purpose computer with sufficient processing power, memory resources, and network throughput capability to handle the necessary workload placed upon it. FIG. 6 illustrates the typical, general-purpose server 116 suitable for implementing one or more embodiments disclosed herein. The server 116 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor 682 may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs which are loaded into the RAM 688 when such programs are selected for execution. The ROM 686 is used to store instructions and perhaps data which are read during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for customer care intelligent routing, comprising:
   a server; and
   a mobile device comprising a transaction component, and an error manager to determine that an error occurred during a point of sale transaction between the transaction component and a proximate point of sale device and to promote transmitting transaction data to the server, wherein the server determines which provider of a plurality of providers is related to the error, and promotes routing of the transaction data to the related provider.

2. The system of claim 1, wherein the server is further operable to promote routing of communication from the mobile device to the related provider.

3. The system of claim 1, wherein the transaction data includes error data.

4. The system of claim 1, wherein the transaction data enables the related provider to communicate with the mobile device to correct the error.

5. The system of claim 1, wherein the plurality of providers comprise a network service provider, a financial provider, a mobile device provider, and a mobile wallet provider.

6. The system of claim 1, wherein the proximate point of sale device sends error data to the mobile device.

7. The system of claim 1, wherein the transaction data comprises historical transaction data.

8. A method for customer care intelligent routing, comprising:
   determining that an error has occurred during a point of sale transaction between a mobile device and a proximate point of sale device;
   determining which provider of a plurality of providers is related to the error; and
   promoting routing of transaction data to the related provider.

9. The method of claim 8, further comprising promoting routing of communication from the mobile device to the related provider.

10. The method of claim 8, wherein the transaction data comprises at least one of error data, device information, application information, device state data, and application state data.

11. The method of claim 8, wherein the transaction data enables the related provider to communicate with the mobile device to correct the error.

12. The method of claim 8, wherein the related provider is one of a network service provider, a financial provider, a mobile device provider, and a mobile wallet provider.

13. The method of claim 8, further comprising sending error data to the mobile device.

14. The method of claim 8, wherein the transaction data comprises historical transaction data.

15. A system for customer care intelligent routing, comprising:

a mobile device comprising a transaction component and an error manager, the error manager determines whether an error has occurred during a point of sale transaction between the transaction component and a proximate point of sale device and promotes determining which provider of a plurality of providers is related to the error, and the error manager further promotes routing of transaction data to the related provider.

16. The system of claim 14, wherein the error manager is further operable to promote routing of communication from the mobile device to the related provider.

17. The system of claim 14, wherein the transaction data includes error data.

18. The system of claim 14, wherein the transaction data enables the related provider to communicate with the mobile device to correct the error.

19. The system of claim 14, wherein the related provider is one of a network service provider, a financial provider, a mobile device provider, and a mobile wallet provider.

20. The system of claim 14, wherein the proximate point of sale device sends error data including a status code to the mobile device.

\* \* \* \* \*